United States Patent [19]

Iijima et al.

[11] Patent Number: 5,760,698

[45] Date of Patent: Jun. 2, 1998

[54] METHOD OF SELECTING AN INPUT APPARATUS

[75] Inventors: Yuko Iijima, Kanagawa; Harumi Kawamura; Makoto Sato, both of Tokyo, all of Japan

[73] Assignee: Sony Corporation, Tokyo, Japan

[21] Appl. No.: 506,477

[22] Filed: Jul. 25, 1995

[30] Foreign Application Priority Data

Aug. 2, 1994 [JP] Japan .................................. 6-200183

[51] Int. Cl.⁶ ........................................................ H04Q 1/00
[52] U.S. Cl. ............................ 340/825.17; 340/825.07; 340/825.52; 340/825.22; 370/362
[58] Field of Search ...................... 340/825.17, 825.07, 340/825.52, 825.5, 505, 825.22; 370/360, 438, 362, 421; 348/722; 364/140

[56] References Cited

U.S. PATENT DOCUMENTS

| | | | |
|---|---|---|---|
| 4,989,081 | 1/1991 | Miyagawa et al. | 340/825.07 X |
| 5,001,473 | 3/1991 | Ritter et al. | 340/825.52 |
| 5,054,022 | 10/1991 | Van Steenbrugge | 370/360 |
| 5,402,419 | 3/1995 | Osakabe et al. | 340/825.52 X |
| 5,457,446 | 10/1995 | Yamamoto | 340/825.5 X |
| 5,488,357 | 1/1996 | Sato et al. | 340/825.22 X |
| 5,499,018 | 3/1996 | Welmer | 340/825.07 |
| 5,502,436 | 3/1996 | Van Steenbrugge | 340/825.5 X |

OTHER PUBLICATIONS

IEEE Standards Draft P1394/Draft 6.4v0. Oct. 14, 1993, pp. 179–192.

*Primary Examiner*—Michael Horabik
*Assistant Examiner*—William H. Wilson, Jr.
*Attorney, Agent, or Firm*—Jay H. Maioli

[57] ABSTRACT

In a system wherein a plurality of electronic apparatuses are connected by a communication control bus for communication between those electronic apparatuses, each of the electronic apparatuses selects an input apparatus by sending an inquiry to all other apparatuses in the system to determine whether they can output data, displays the apparatuses which respond that output is possible as candidate input apparatuses, and selects the input apparatus from among the candidate input apparatuses. For an electronic apparatus which can not output data, the reason for such inability to output data can be displayed at either the apparatus incapable of outputting data or the apparatus which is to select an input apparatus. Input apparatus selection can be also performed using a list made up of still images created from the image data supplied by candidate input apparatuses.

16 Claims, 15 Drawing Sheets

|     |      |      |         |             | COMMAND | DATA |     |
|-----|------|------|---------|-------------|---------|------|-----|
| A1  | VTR1 | CAM1 | INQUIRY | DIGITAL I/F | DIGITAL OUT STATUS | DUMMY |     |
| A2  | CAM1 | VTR1 | ANSWER  | DIGITAL I/F | DIGITAL OUT STATUS | POSSIBLE | OK |
| A3  | VTR1 | VTR2 | INQUIRY | DIGITAL I/F | DIGITAL OUT STATUS | DUMMY |     |
| A4  | VTR2 | VTR1 | ANSWER  | DIGITAL I/F | DIGITAL OUT STATUS | POSSIBLE | OK |
| A5  | VTR1 | VTR3 | INQUIRY | DIGITAL I/F | DIGITAL OUT STATUS | DUMMY |     |
| A6  | VTR3 | VTR1 | ANSWER  | DIGITAL I/F | DIGITAL OUT STATUS | POSSIBLE | OK |

|  | | | | | COMMAND | DATA | |
|---|---|---|---|---|---|---|---|
| B 1 | VTR2 | CAM1 | INQUIRY | DIGITAL I/F | DIGITAL OUT STATUS | DUMMY | |
| B 2 | CAM1 | VTR2 | ANSWER | DIGITAL I/F | DIGITAL OUT STATUS | POSSIBLE | OK |
| B 3 | VTR2 | VTR1 | INQUIRY | DIGITAL I/F | DIGITAL OUT STATUS | DUMMY | |
| B 4 | VTR1 | VTR2 | ANSWER | DIGITAL I/F | DIGITAL OUT STATUS | RECORDING | OK |
| B 5 | VTR2 | VTR3 | INQUIRY | DIGITAL I/F | DIGITAL OUT STATUS | DUMMY | |
| B 6 | VTR3 | VTR2 | ANSWER | DIGITAL I/F | DIGITAL OUT STATUS | POSSIBLE | OK |

FIG. 10
|  | | | | | COMMAND | DATA | |
|---|---|---|---|---|---|---|---|
| C 1 | VTR3 | CAM1 | INQUIRY | DIGITAL I/F | DIGITAL OUT STATUS | DUMMY | |
| C 2 | CAM1 | VTR3 | ANSWER | DIGITAL I/F | DIGITAL OUT STATUS | POSSIBLE | OK |
| C 3 | VTR3 | VTR1 | INQUIRY | DIGITAL I/F | DIGITAL OUT STATUS | DUMMY | |
| C 4 | VTR1 | VTR3 | ANSWER | DIGITAL I/F | DIGITAL OUT STATUS | RECORDING | OK |
| C 5 | VTR3 | VTR2 | INQUIRY | DIGITAL I/F | DIGITAL OUT STATUS | DUMMY | |
| C 6 | VTR2 | VTR3 | ANSWER | DIGITAL I/F | DIGITAL OUT STATUS | RECORDING | OK |
FIG. 11
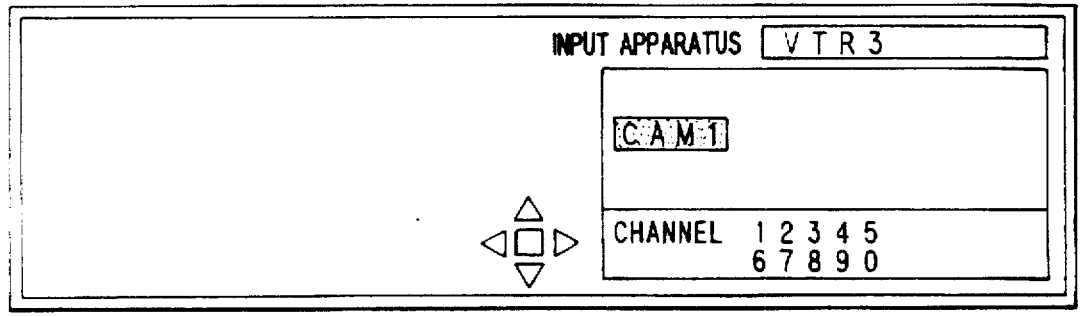
FIG. 12
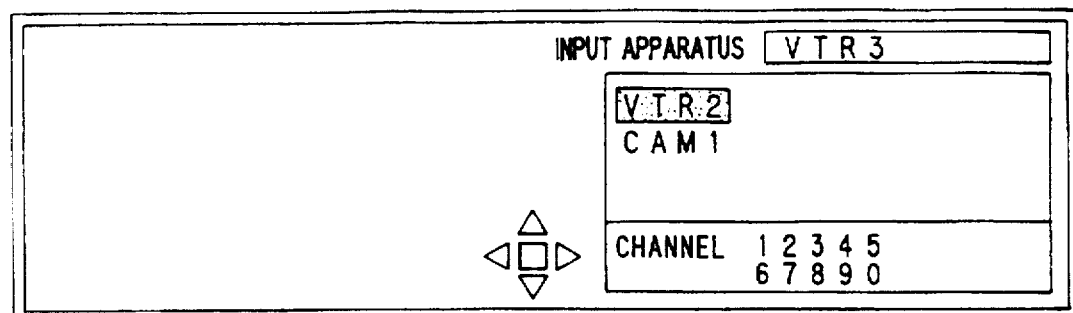

—— P 1 3 9 4 SERIAL BUS

CSP: CYCLE START PACKET
ISO: ISOCHRONOUS COMMUNICATION PACKET
ASYNC: ASYNCHRONOUS COMMUNICATION PACKET

DISPLAY SCREEN

UP
LEFT ◁□▷ RIGHT   CENTER : EXECUTION KEY
DOWN

FIG.20

| | | | | | COMMAND | AV SIGNAL SOURCE | AV SIGNAL DISTINATION | |
|---|---|---|---|---|---|---|---|---|
| A1 | VTR1 | TV1 | COMMAND | SW BOX | CONNECT PLUGS | TUNER1 | PLUG? | |
| A2 | TV1 | VTR1 | COMMAND | SW BOX | CONNECT PLUGS | TUNER1 | PLUG1 | OK |
| A3 | VTR1 | TV1 | COMMAND | SW BOX | DISCONNECT PLUGS | TUNER1 | PLUG1 | |
| A4 | TV1 | VTR1 | COMMAND | SW BOX | DISCONNECT PLUGS | TUNER1 | PLUG1 | OK |
| A5 | VTR1 | VTR2 | COMMAND | SW BOX | CONNECT PLUGS | DECK | PLUG? | |
| A6 | VTR2 | VTR1 | COMMAND | SW BOX | CONNECT PLUGS | DECK | PLUG1 | OK |
| A7 | VTR1 | VTR2 | COMMAND | SW BOX | DISCONNECT PLUGS | DECK | PLUG1 | |
| A8 | VTR2 | VTR1 | COMMAND | SW BOX | DISCONNECT PLUGS | DECK | PLUG1 | OK |
| A9 | VTR1 | VTR3 | COMMAND | SW BOX | CONNECT PLUGS | DECK | PLUG? | |
| A10 | VTR3 | VTR1 | COMMAND | SW BOX | CONNECT PLUGS | DECK | PLUG1 | OK |
| A11 | VTR1 | VTR3 | COMMAND | SW BOX | DISCONNECT PLUGS | DECK | PLUG1 | |
| A12 | VTR3 | VTR1 | COMMAND | SW BOX | DISCONNECT PLUGS | DECK | PLUG1 | OK |
| A13 | VTR1 | CAM1 | COMMAND | SW BOX | CONNECT PLUGS | DECK | PLUG? | |
| A14 | CAM1 | VTR1 | COMMAND | SW BOX | CONNECT PLUGS | DECK | PLUG1 | OK |
| A15 | VTR1 | CAM1 | COMMAND | SW BOX | DISCONNECT PLUGS | DECK | PLUG1 | |
| A16 | CAM1 | VTR1 | COMMAND | SW BOX | DISCONNECT PLUGS | DECK | PLUG1 | OK |

FIG.24

| | | | | | Command | AV Signal Source | AV Signal Distination | |
|---|---|---|---|---|---|---|---|---|
| B1 | VTR1 | TV1 | COMMAND | SW BOX | CONNECT PLUGS | TUNER1 | PLUG? | |
| B2 | TV1 | VTR1 | COMMAND | SW BOX | CONNECT PLUGS | TUNER1 | PLUG1 | OK |
| B3 | VTR1 | TV1 | COMMAND | SW BOX | DISCONNECT PLUGS | TUNER1 | PLUG1 | |
| B4 | TV1 | VTR1 | COMMAND | SW BOX | DISCONNECT PLUGS | TUNER1 | PLUG1 | OK |
| B5 | VTR1 | VTR2 | COMMAND | SW BOX | CONNECT PLUGS | DECK | PLUG? | |
| B6 | VTR2 | VTR1 | COMMAND | SW BOX | CONNECT PLUGS | DECK | PLUG1 | OK |
| B7 | VTR1 | VTR2 | COMMAND | SW BOX | DISCONNECT PLUGS | DECK | PLUG1 | |
| B8 | VTR2 | VTR1 | COMMAND | SW BOX | DISCONNECT PLUGS | DECK | PLUG1 | OK |
| B9 | VTR1 | VTR3 | COMMAND | SW BOX | CONNECT PLUGS | DECK | PLUG? | |
| B10 | VTR3 | VTR1 | COMMAND | SW BOX | CONNECT PLUGS | DECK | PLUG1 | OK |
| B11 | VTR1 | VTR3 | COMMAND | SW BOX | DISCONNECT PLUGS | DECK | PLUG1 | |
| B12 | VTR3 | VTR1 | COMMAND | SW BOX | DISCONNECT PLUGS | DECK | PLUG1 | OK |
| B13 | VTR1 | CAM1 | COMMAND | SW BOX | CONNECT PLUGS | DECK | PLUG? | |
| B14 | CAM1 | VTR1 | COMMAND | SW BOX | CONNECT PLUGS | DECK | PLUG? | REJECT |

— P1394 SERIAL BUS

1

METHOD OF SELECTING AN INPUT APPARATUS

BACKGROUND OF THE INVENTION

1. Field of the Invention

In the field of systems for connecting a plurality of electronic apparatuses by a communication control bus on which control signals and data can coexist to allow communication between those electronic apparatuses, the present invention relates to a method of selecting an electronic apparatus in such a system to serve as a source of data when data is to be input to each of the electronic apparatuses from the selected electronic apparatus.

2. Description of the Related Art

Communication systems utilizing a P1394 serial bus have been proposed as communication systems in which electronic apparatuses such as a video tape recorder (hereinafter referred to as "VTR"), a television set (hereinafter referred to as "TV"), a VTR combined with a camera (hereinafter referred to as "CAM"), and a computer are connected by a communication control bus on which control signals and data can coexist to allow the transmission and reception of the control signals and data between such apparatuses.

The details of such a serial bus is disclosed in "IEEE P1394 Serial Bus Specifications" (issued on Oct. 14, 1993).

An example of such a communication system will now be described with reference to FIG. 13. This communication system includes VTR's 1, 2, and 3 and a CAM 1. Connection between the CAM 1 and VTR 1, VTR 1 and VTR 2, and VTR 2 and VTR 3 is established by P1394 serial buses. Since each of those electronic apparatuses has a function of relaying control signals and data on a P1394 serial bus, this system is equivalent to a communication system in which electronic apparatuses are connected to a common P1394 serial bus.

FIG. 14 is a block diagram showing a basic configuration of a VTR as an example of the electronic apparatuses in the communication system shown in FIG. 13. This VTR includes a deck portion 1, a tuner portion 2, an operation portion 3 and a display portion 4 serving as a user interface, a microcomputer 5 which performs the creation of packets to be described later, the storage of addresses and data, and the like, a digital interface 6 for interface with a P1394 serial bus, and a switch box portion 7 for switching signals between the deck portion 1, tuner portion 2, and digital interface 6. If this electronic apparatus is a television set, a monitor portion and an amplifier portion are provided instead of the deck portion 1 and the display portion 14 is not included. If the apparatus is a CAM, a camera portion is provided instead of the tuner portion 2.

In the communication system shown in FIG. 13, communication is performed in predetermined communication cycles (e.g., 125 μsec. each) as shown in FIG. 15. It is possible to perform both of isochronous communication wherein data such as digital AV signals is continuously transmitted at a predetermined data rate and asynchronous communication wherein control signals such as connection control commands are irregularly transmitted as needed.

A cycle start packet CSP is provided at the beginning of a communication cycle and is followed by a period which is set for transmission of isochronous communication packets. The communication packets are assigned channel Nos. 1, 2, 3, . . . , N to allow simultaneous communication of a plurality of channels. For example, if communication from the CAM 1 to VTR 1 is assigned the channel No. 1, the CAM 1 transmits isochronous communication packets having the channel No. 1 immediately after the cycle start packet CSP, and the VTR 1 monitors the bus and accepts the isochronous communication packets having the channel No. 1 to establish the communication.

If the channel No. 2 is assigned to communication from the VTR 2 to VTR 3, the communication from the VTR 2 to VTR 3 can take place concurrently with the communication from the CAM 1 to the VTR 1. Then, asynchronous communication is carried out during a period that starts when the transmission of the isochronous communication packets is completed for all the channels to be transmitted and lasts until the next cycle start packet CSP.

In a communication system utilizing a P1394 serial bus, each electronic apparatus connected by the bus is automatically assigned a node ID (physical address) depending on the mode of connection. When an electronic apparatus is added to or removed from the communication system, the bus is reset and node ID's are automatically reassigned depending on the new mode of connection.

In the communication system shown in FIG. 13, since each electronic apparatus is compatible with a D2B (domestic digital bus), each has a logical address (D2B address) which depends on the category it belongs to (CAM 1, VTR 1, VTR 2, or VTR 4) in addition to a physical address as described above. In some communication systems, apparatuses such as computers, hard disc devices, etc. which are not D2B-compatible may be connected to the bus. The D2B addresses are characterized in that they are determined in the order in which apparatuses are initially connected to a communication system and are kept unchanged even after a bus reset for apparatuses which have not been removed from the system.

Therefore, even if the CAM 1 is removed while the VTR 2 is recording a reproduction signal from the VTR 1, the VTR 1 and VTR 2 which are the D2B addresses of the source and destination, respectively, are kept unchanged, and the communication between the VTR's 1 and 2 can be continued.

In a communication system having the above-described configuration, when an operation is performed at the operation portion 3 of each electronic apparatus to select an input apparatus, i.e., an electronic apparatus from which input of a digital AV signal is desired (hereinafter referred to as "input apparatus selection operation), the apparatus issues an inquiry to all other electronic apparatuses in the system using an asynchronous communication packet to determine whether they are D2B-compatible and displays on the display portion 4 the D2B addresses of the electronic apparatuses other than itself which have been identified as D2B-compatible apparatuses.

For example, the VTR 3 in FIG. 13 will display as shown in FIG. 16. This is an example of a display using the fluorescent tube of the display portion 4. In FIG. 16, "VTR 3" is the logical address of the VTR 3 itself according to its category. The window "input apparatus" shows the categorized logical addresses of the apparatuses which are candidates for the selection of an input apparatus. In this case, the display shows VTR 1, VTR 2, and CAM 1.

Further, operation keys for moving the cursor and an execution key are displayed on the left of the window showing the input apparatuses. The user selects an input apparatus by moving the cursor to the position of the desired apparatus and by pressing the execution key while monitoring the contents of the display. The channels shown in FIG. 16 are the channels of the television broadcasts selected by the VTR's and the tuner of the television.

An example of such a communication system will now be described with reference to FIG. 27. This communication system includes a TV 1, VTR's 1, 2, 3, and a CAM 1. The connection between the TV 1 and VTR 1, VTR 1 and VTR 2, VTR 2 and VTR 3, and VTR 3 and CAM 1 is established by P1394 serial buses capable of transmitting a mixture of control signals and data. Since each of the electronic apparatuses has a function of relaying the control signals and data on the P1394 serial bus, this system is equivalent to a communication system wherein a electronic apparatuses are connected to a common P1394 serial bus.

FIG. 28 is a block diagram showing a basic configuration of a VTR as an example of the electronic apparatuses in the communication system shown in FIG. 27. This VTR includes a deck portion 11, a tuner portion 12, an operation portion 13 and a display portion 14 serving as a user interface, a microcomputer 15 which performs the creation of packets to be described later, the storage of addresses and data, and the like, a digital interface 16 for interface with a P1394 serial bus, and a switch box portion 17 for switching signals between the deck portion 11, tuner portion 12, and digital interface 16. If this electronic apparatus is a television set, a monitor portion and an amplifier portion are provided instead of the deck portion 11 and the display portion 14 is not included. If the apparatus is a CAM, a camera portion is provided instead of the tuner portion 12.

In the communication system shown in FIG. 27, communication is performed in predetermined communication cycles (e.g., 125 μsec. each) as shown in FIG. 15. It is possible to perform both of isochronous communication wherein data such as digital AV signals is continuously transmitted at a predetermined data rate and asynchronous communication wherein control signals such as connection control commands are irregularly transmitted as needed.

A cycle start packet CSP is provided at the beginning of a communication cycle and is followed by a period which is set for transmission of isochronous communication packets. The communication packets are assigned channel Nos. 1, 2, 3, . . . , N to allow simultaneous communication of a plurality of channels. For example, if communication from the CAM 1 to VTR 1 is assigned the channel No. 1, the CAM 1 transmits isochronous communication packets having the channel No. 1 immediately after the cycle start packet CSP, and the VTR 1 monitors the bus and accepts the isochronous communication packets having the channel No. 1 to establish the communication.

If the channel No. 2 is assigned to communication from the VTR 2 to VTR 3, the communication from the VTR 2 to VTR 3 can take place concurrently with the communication from the CAM 1 to VTR 1. The, asynchronous communication is carried out during a period that starts when the transmission of the isochronous communication packets is completed for all the channels to be transmitted and lasts until the next cycle start packet CSP.

In a communication system utilizing a P1394 serial bus, each electronic apparatus connected by the bus is automatically assigned a node ID (physical address) depending on the mode of connection. When an electronic apparatus is added to or removed from the communication system, the bus is reset and node ID's are automatically reassigned depending on the new mode of connection.

In the communication system shown in FIG. 27, since each electronic apparatus is compatible with a D2B, each has a D2B address in addition to the physical address as described above. In some communication systems, apparatuses such as computers, hard disc devices, etc. which are not D2B-compatible may be connected to the bus. The D2B addresses are characterized in that they are determined in the order in which apparatuses are initially connected to a communication system and are kept unchanged even after a bus reset for apparatuses which have not been removed from the system. Therefore, even if the CAM 1 is removed while the VTR 2 is recording a reproduction signal from the VTR 1, VTR 1 and VTR 2 which are the D2B addresses of the source and destination, respectively, are kept unchanged, and the dubbing between VTR's 1 and 2 can be continued.

In a communication system having the above-described configuration, when the input apparatus selection operation is performed at the operation portion 13 of each electronic apparatus, the apparatus issues an inquiry to all other electronic apparatuses in the system using an asynchronous communication packet to determine whether they are D2B-compatible and displays on the display portion 14 the D2B addresses of the electronic apparatuses other than itself which have been identified as D2B-compatible apparatuses.

For example, the display of the VTR 3 in FIG. 27 is shown in FIG. 16. This is an example of a display using the fluorescent tube of the display portion 14 of the VTR 13 shown in FIG. 28. In FIG. 27, VTR 3 is the logical address of the VTR 3 itself according to its category. The window "input apparatus" in FIG. 16 shows the categorized logical addresses of the apparatuses which are candidates for the selection of an input apparatus. In this case, the display shows VTR 1, VTR 2, and CAM 1. Further, operation keys for moving the cursor and an execution key are displayed on the left of the window showing the input apparatuses. The user selects an input apparatus by moving the cursor to the position of the desired apparatus and by pressing the execution key while monitoring the contents of the display. The channels shown in FIG. 16 are the channels of the television broadcasts selected by VTR 1, VTR 2 and VTR 3 and the tuner of the television TV 1.

However, according to the conventional method of selecting an input apparatus wherein all apparatuses having a D2B address are displayed, each apparatus in the system is displayed as a candidate input apparatus even if it is disabled from outputting information signals for some reason, e.g., a state wherein it is not loaded with a video tape or it is receiving the input of information signals from another apparatus. This can cause erroneous selection of an input apparatus.

Further, if a desired apparatus is selected from among candidate input apparatuses including apparatuses which can not be an input apparatus, the selection operation by a user can take a long time because many apparatuses have to be examined for selection.

In addition, according to the above-described input apparatus selection method, an input apparatus is selected based on the user's understanding of the D2B address thereof. As a result, erroneous selection can be caused by a change in the actual D2B address of the desired input apparatus which has not been recognized by the user.

As described above, a D2B address is not reassigned each time a bus reset occurs unlike the node ID. However, if a plurality of apparatuses on a system are removed and some of the removed apparatuses are connected to the system again, the D2B addresses may be changed (This is because the D2B addresses of apparatuses in the same category are assigned unique D2B addresses in an ascending order, e.g., the D2B addresses VTR 1, VTR 2, and VTR 3 are assigned in the order the devices were connected.)

SUMMARY OF THE INVENTION

The present invention has been conceived to solve the problems as described above, and it is an object of the invention to provide a method of selecting input apparatuses wherein it is possible to display apparatuses which can output information signals as candidate input apparatuses.

It is another object of the invention to provide a method of selecting input apparatuses wherein a desired apparatus can be correctly selected even when the assignment of the D2B addresses has been changed.

In order to solve the above-described problems, according to the present invention, in a system wherein a plurality of electronic apparatuses are connected by a communication control bus for communication between those electronic apparatuses, each of the electronic apparatuses selects an input apparatus by sending an inquiry to all other apparatuses in the system to determine whether they can output data, displaying the apparatuses which respond that output is possible as candidate input apparatuses, and selecting the input apparatus from among the candidate input apparatuses.

Further, for an electronic apparatus which can not output data, the present invention makes it possible to display the reason for its inability to output data. The reason for the inability to output data may be displayed at either the apparatus incapable of outputting data or the apparatus which is to select an input apparatus.

In order to solve the above-described problems, according to the present invention, in a system wherein a plurality of electronic apparatuses are connected by a communication control bus for communication between those electronic apparatuses, each of the electronic apparatuses selects an input apparatus by causing other electronic apparatuses in the system to transmit image data, creates a list constituted by still images from the image data, displays the still image list, and selects the input apparatus with reference to the displayed still image list.

If the still image list is created from images of one frame each from each of the transmitting apparatuses, one frame of image will be displayed for each apparatus. If the still image list is created from data of plural frames for each apparatus, a dynamic image for a short period of time will be displayed for each apparatus. This results in an increase in the amount of image data available for reference in selecting an input apparatus, allowing reliable selection.

While an electronic apparatus incapable of transmitting image data does not need to be included in the still image list, a still image indicating the reason why the apparatus unable to transmit image data may be included in the list to allow the user to take an action to enable the transmission of image data from that apparatus.

In addition, after the creation of the still image list, it is possible to cause other electronic apparatus in the system to sequentially transmit image data for a predetermined period of time again. Such image data can be also referred to during the selection of an input apparatus. This makes it possible to select an input apparatus with reference to dynamic images using only the minimum amount of image memory required for the creation of the still image list.

According to the present invention, when an input apparatus is to be selected, only apparatuses which can actually output data are displayed as candidate input apparatuses. This makes it possible to prevent an apparatus incapable of outputting data from being selected by mistake. Further, since only apparatuses which can be actually selected as input apparatuses are displayed, the time required for the selecting operation is reduced even if the input apparatuses are sequentially selected through an operation such as toggling.

Further, for an apparatus which can not be an input apparatus, the present invention allows the reason to be displayed. This makes it possible for a user to select a desired input apparatus even if it is disabled from outputting data by taking an action to eliminate the cause of such impossibility provided it is not a malfunction of the apparatus.

The present invention allows a user to select an input apparatus with reference to a displayed still image list. As a result, even if the D2B address of the input apparatus that the user has initially recognized is different from the actual D2B address at the time of selection, the user can select the input apparatus by finding the desired image without the need for checking the D2B address of the desired apparatus each time selection is attempted. This not only prevents erroneous selection but is user friendly because he or she only needs to select the desired image from the list showing various still images without having to know the D2B address of an input apparatus.

As described above in detail, the present invention prevents an apparatus which can not provide output from being selected by mistake because an inquiry is sent to other apparatuses in the system to determine whether they can output data to display apparatuses.

The operability during selection is also improved in that the maximum number of operations required for selection can be limited to the number of apparatuses which can provide input even if selection is performed by a toggle operation wherein candidate input apparatuses are sequentially examined one by one.

Further, for an apparatus which can not be an input apparatus, the present invention allows the reason to be displayed. This makes it possible for the user to correct the condition that prevents the apparatus from outputting data.

As described above, according to the present invention, an input apparatus is selected based on image data output by each electronic apparatus. This not only prevents erroneous selection where the D2B address of a desired apparatus has been changed but is user friendly because the user does not have to know the D2B address to perform of the selection of an input apparatus.

BRIEF DESCRIPTION OF THE DRAWINGS

FIG. 10 illustrates an example of a structure of each command packet used in the procedures shown in FIG. 9.

FIG. 11 illustrates an example of the display of candidate input apparatuses on a VTR 3.

FIG. 12 illustrates another example of the display of candidate input apparatuses on VTR 3.

FIG. 20 illustrates an example of a structure of each command packet used in the procedures shown in FIG. 18.

FIG. 24 illustrates an example of a structure of a command packet used in an embodiment of the invention.

FIG. 24 illustrates an example of a structure of each command packet used in the procedures shown in FIG. 23.

DETAILED DESCRIPTION OF PREFERRED EMBODIMENTS

Figure 13:
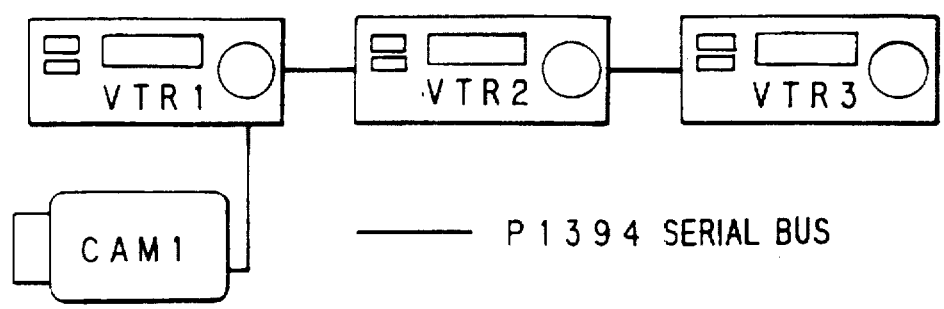
FIG. 13 illustrates an example of an audio-visual communication system utilizing a P1394 serial bus.
Figure 14:
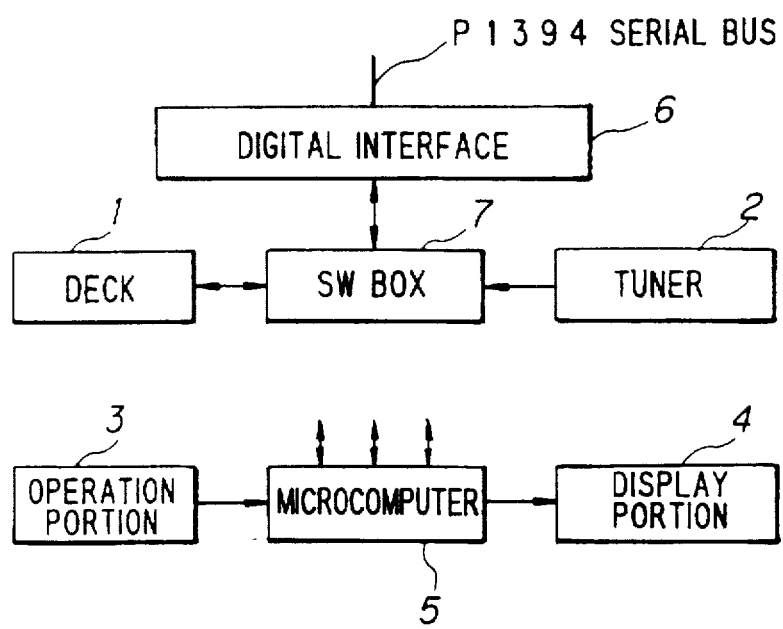
FIG. 14 illustrates a schematic configuration of a VTR in the communication system shown in FIG. 13.

An embodiment of the present invention will now be described with reference to the drawings. The present embodiment addresses selection of an input apparatus during communication between the apparatuses in the communication system shown in FIG. 13 with reference to the following cases.

(1) All of the VTR's 1, 2, and 3 and the CAM 1 are not performing any operation.

(2) The VTR 2 records AV (audio-visual) signals reproduced by the CAM 1 concurrently with the recording of the AV signal from the CAM 1 by the VTR 1.

(3) The VTR 3 requests the VTR 2 to output AV signals while the VTR's 1 and 2 are recording AV signals reproduced by the CAM 1.

Figure 1:
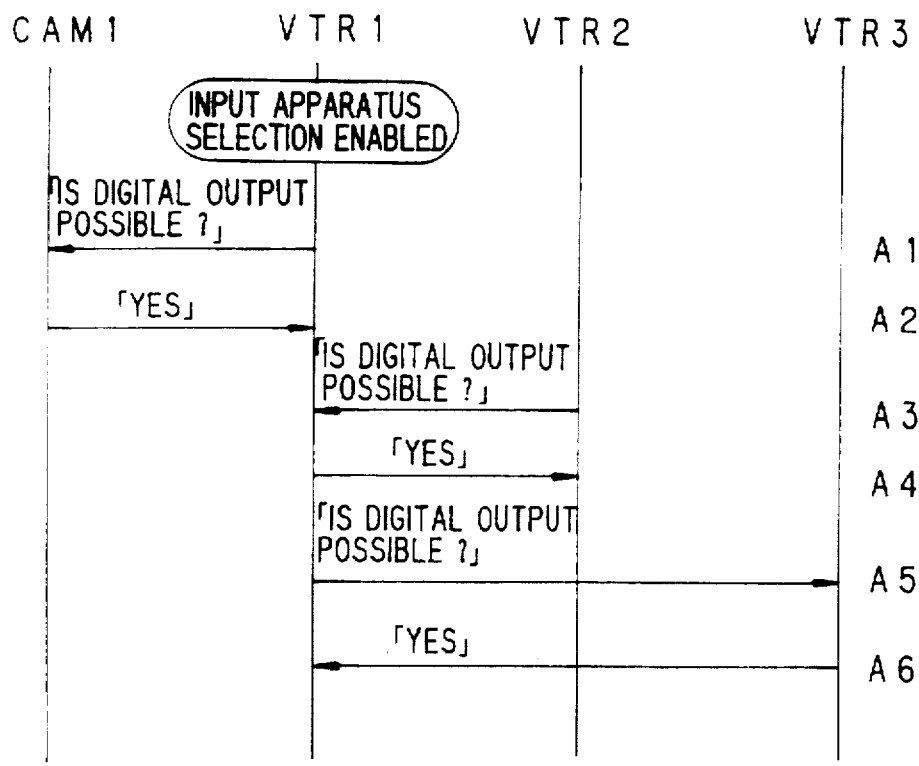
FIG. 1 illustrates an example of command transmission/reception procedures used in an embodiment of the invention during selection of input apparatuses.

(1) When the VTR's (VTR 1, VTR 2, VTR 3) and the CAM 1 are not performing any operation, if an input apparatus selection operation is enabled at the VTR 1 to input AV signals from the CAM 1, an inquiry is issued from the VTR 1 to all other apparatuses in the system on whether they can output data. FIG. 1 shows an example of procedures for the exchange of such inquiries and responses. First, the VTR 1 asks the CAM 1 whether it can perform digital output (A1). The CAM 1 responds "Yes" (A2). Similarly, the VTR 1 asks the VTR's 2 and 3 whether they can perform digital output, A3, A5, and receives a response "Yes" from each of them A4, A6.

Figure 2:
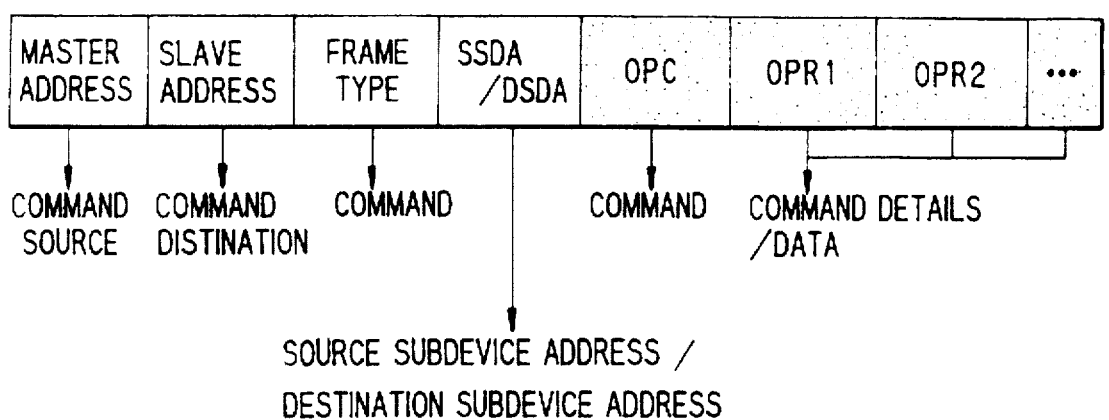
FIG. 2 illustrates an example of a structure of a command packet used in an embodiment of the invention.
Figures 3, 4:
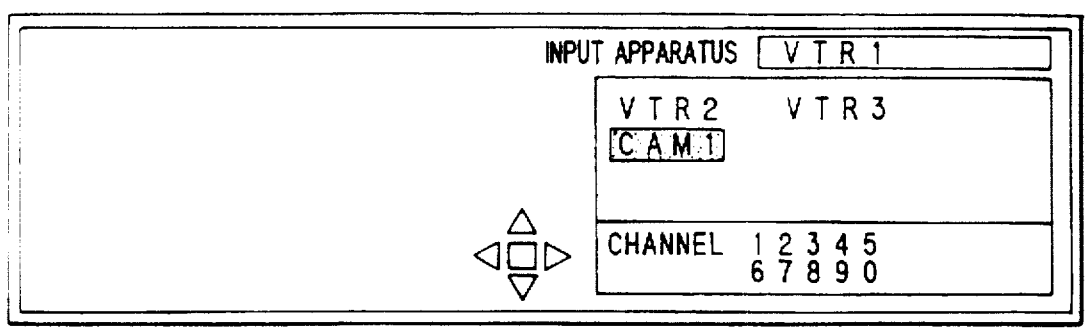
FIG. 3 illustrates an example of a structure of each command packet used in the procedures shown in FIG. 1.
FIG. 4 illustrates an example of the display of candidate input apparatuses on a VTR 1.

FIG. 2 illustrates an example of a structure of a command packet used in the present embodiment, and FIG. 3 illustrates examples of the command packets used in the procedures A1 through A6 in FIG. 1. The "subdevice" in the abbreviated term SSDA/DSDA in FIG. 2 refers to a functional unit (deck, tuner, etc.) in an apparatus. "Dummy" represents a location intended for the data of a response, and "OK" indicates that a response has been sent in response to the inquiry command.

In this case, since VTR 1 VTR 2, VTR 3, and CAM 1 can output AV signals, the display portion of the VTR 1 displays all other apparatuses in the system, i.e., the VTR 2, VTR 3, and CAM 1 as shown in FIG. 4. If the CAM 1 is selected, connection is established between the CAM 1 and VTR 1. At this time, if the CAM 1 is set to a reproduction mode, AV signals reproduced by the CAM 1 are input to the VTR 1. If the CAM 1 is not reproducing, a monitor (not shown) connected to the output of the VTR 1 will display no image and show a blank screen.

Similarly, when input apparatus selection is enabled at the VTR 2, the VTR 1, VTR 3, and CAM 1 are displayed as candidate input apparatuses; when input apparatus selection is enabled at the VTR 3, the VTR 1, VTR 2, and CAM 1 are displayed as candidate input apparatuses.

Although FIG. 1 shows that the inquiry on the possibility of data output is sequentially followed by the reception of the response thereto for each apparatus, it is possible to employ a procedure wherein the inquiry is first issued to all apparatuses simultaneously and then the responses are received.

(2) In the case that the VTR 2 records AV signals reproduced by the CAM 1 concurrently with the recording of the AV signal from the CAM 1 by the VTR 1, the VTR 1 has already selected the CAM 1 and records the AV signal reproduced by the CAM 1 if it is set to a recording mode. If input apparatus selection is enabled at the VTR 2 in such a state to record the AV signals from the CAM 1, an inquiry is issued from the VTR 2 to all other apparatuses in the system simultaneously on whether they can output data.

Figures 5, 6:
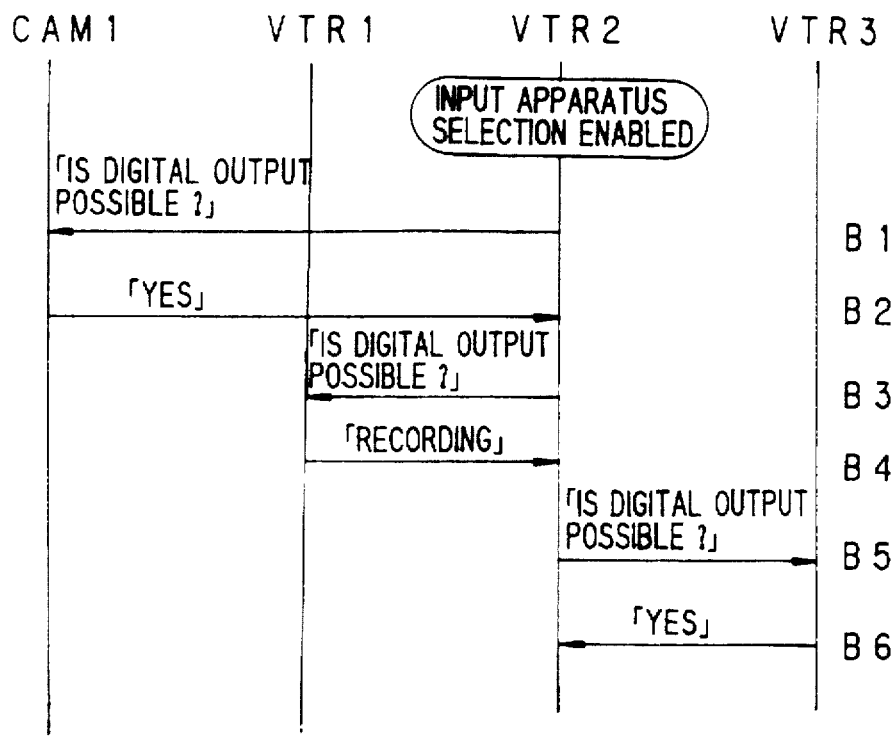
FIG. 5 illustrates another example of the command transmission/reception procedures used in an embodiment of the invention during selection of input apparatuses.
FIG. 6 illustrates an example of a structure of each command packet used in the procedures shown in FIG. 5.
Figure 7:
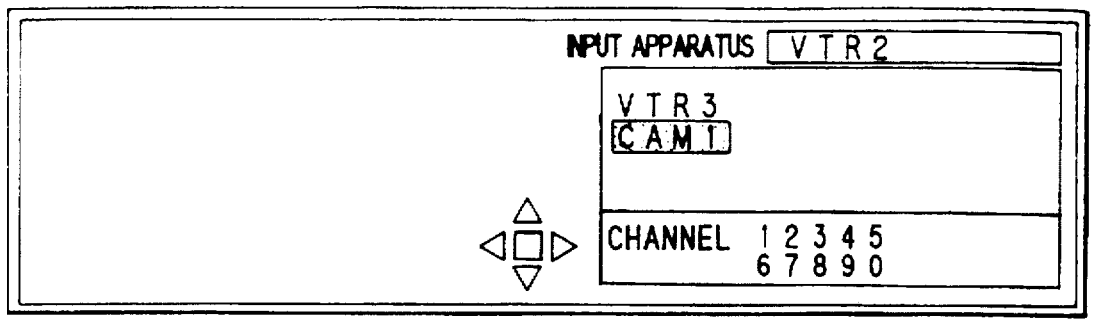
FIG. 7 illustrates an example of the display of candidate input apparatuses on a VTR 2.
Figure 8:
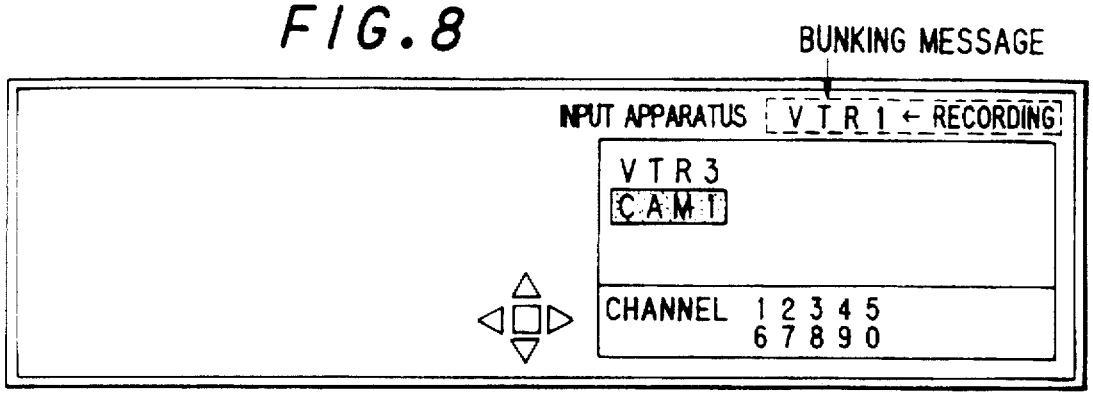
FIG. 8 illustrates an example of a warning message displayed on VTR 1.

FIG. 5 illustrates examples of commands used for this inquiry and FIG. 6 illustrates examples of structures of the command packets. In this case, since the VTR 1 responds that it is recording (B4), it is determined to be unable to output data. Therefore, as shown in FIG. 7, the VTR 3 and CAM 1 are displayed as candidate input apparatuses on the display portion of the VTR 2 using a fluorescent tube. If the CAM 1 is selected and the VTR 2 is set to a recording mode, the VTR 2 can also record the AV signals reproduced by the CAM 1. At the same time, the display portion of the VTR 1 displays a warning message "recording" as shown in FIG. 8 which allows the user to recognize that the VTR 1 can not be an input apparatus.

(3) When the VTR 3 requests the VTR 2 to output AV signals while VTR 1 and VTR 2 are recording AV signals reproduced by the CAM 1, if an input apparatus selection operation is enabled at the VTR 3 to cause the AV signals reproduced by the VTR 2 to be input to the VTR 3, an inquiry is issued from the VTR 3 to all other apparatuses in the system on whether they can output data.

Figure 9:
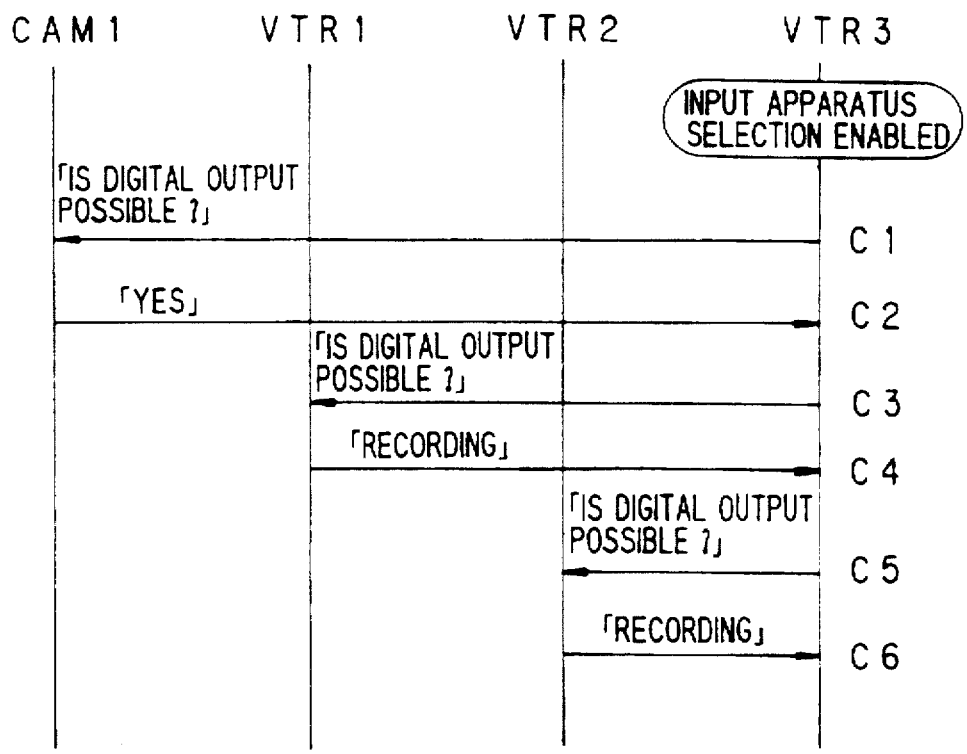
FIG. 9 illustrates still another example of the command transmission/reception procedures used in an embodiment of the invention during selection of input apparatuses.

FIG. 9 illustrates examples of commands used for this inquiry and FIG. 10 illustrates examples of structures of the command packets. In this case, since the VTR 1 and VTR 2 respond that they are recording (C4 and C6), only the CAM 1 is displayed as a candidate input apparatus using a fluorescent tube on the display portion of the VTR 3. The display portions of both VTR 1 and VTR 2 display a warning message "recording" as in FIG. 8 using a fluorescent tube, which makes it possible to recognize that they can not be input apparatuses.

Therefore, the VTR 3 can not receive input from the VTR 2. However, if the VTR 3 must receive input from the VTR 2 even by interrupting the recording operation between the CAM 1 and VTR 2, the VTR 2 can be also displayed as a candidate input apparatus using the fluorescent tube as shown in FIG. 12 by setting the VTR 2 to a stop mode in spite of the warning message "recording" to interrupt the recording operation between the CAM 1 and VTR 2. If the VTR 2 is then selected, the VTR 3 can record the AV signals reproduced by the VTR 2.

Although a P1394 serial bus is used as a communication control bus in the present embodiment, other digital buses may be used as long as they can carry a mixture of control signals and data.

The description so far has addressed the case wherein either input or output is selected. Where input and output can be simultaneously performed, warning messages such as "recording" are output only when the allowable number of inputs and outputs (the number of input/output plugs) specific to each apparatus is exceeded.

The present invention is not limited to communication systems wherein AV apparatuses are connected but may be applied to systems which transmit and receive to and from a computer connected thereto. Although the description has been made with reference to a fluorescent display tube of a VTR, selection of an input apparatus may be performed using an LCD of a VTR or a screen of a television set and the like.

Further, according to the present embodiment, an apparatus which selects an input apparatus displays only apparatuses capable of supplying input thereto, and the warning message is displayed at apparatuses which can not output data. However, an arrangement may be made in which the warning message is displayed on the apparatus which selects an input apparatus, i.e., all apparatuses in the system are displayed including those which can be selected and those which can not be selected and the warning message is displayed for the apparatuses which can not be selected.

In addition, although only the warning message "recording" has been described as an example, various warning messages may be displayed including "no tape", "end of tape", which are messages regarding the state of the tape and "power supply off" etc.

Although a dedicated command is used for inquiry in the present embodiment, an alternative method for inquiry command transmission may be used wherein input apparatus selection is performed by transmitting a output command to each subdevice of each potential input apparatus, e.g., "input from the deck" or "input from the tuner", to other apparatuses in the system simultaneously; an inquiry is sent only to apparatuses which respond that they reject the request for output and the reason for such rejection to allow display of a specific warning message such as "inputting to the deck".

Figure 15:
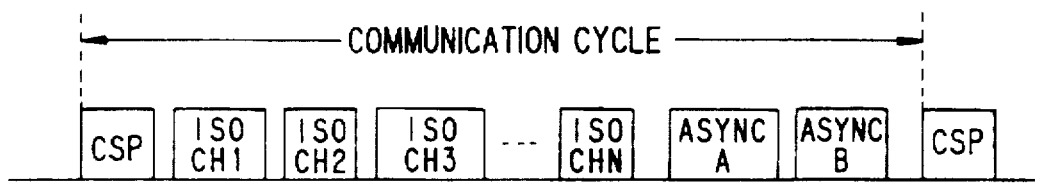
FIG. 15 illustrates an example of a communication cycle in a communication system utilizing P1394 serial buses.
Figure 16:
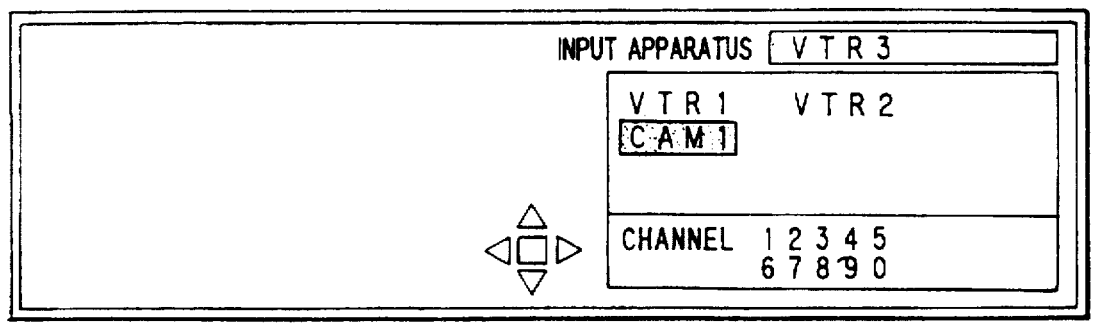
FIG. 16 illustrates an example of a display for input apparatus selection in the communication system shown in FIG. 13.

Another embodiment of the present invention will now be described with reference to the drawings. The present embodiment addresses an example of input apparatus selection utilizing a list constituted by still images representing apparatuses in the communication system shown in FIG. 15.

Figure 17:
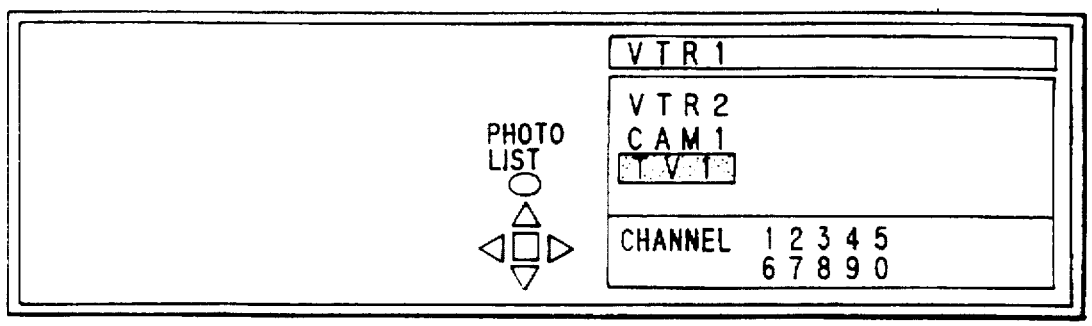
FIG. 17 illustrates an example of a display for input apparatus selection in an embodiment of the present invention.

FIG. 17 illustrates an example of a display for input apparatus selection according to the present embodiment. In FIG. 17, VTR 1 is the D2B address of the apparatus which is going to select an input apparatus, and VTR 2, CAM 1, and TV 1 are the D2B addresses of apparatuses which can be selected as an input apparatus. The PHOTO LIST key is a key which is operated to create a still image list. The cursor selection keys and channel numbers serve the same purposes as those in FIG. 15.

Figure 27:
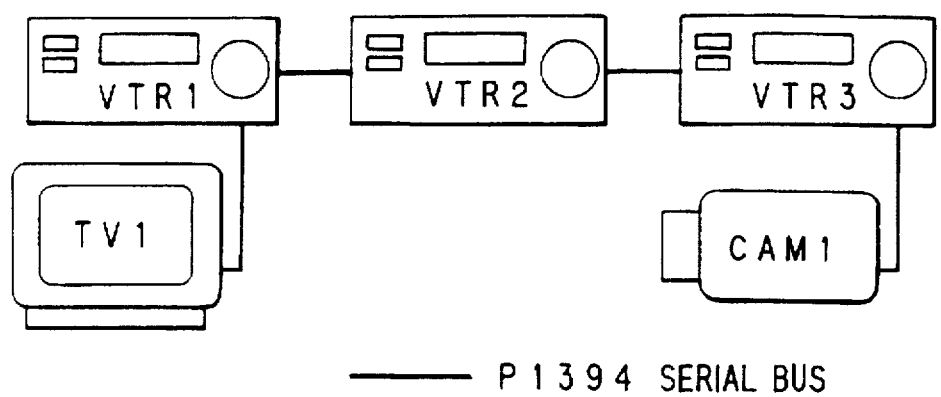
FIG. 27 illustrates an example of a communication system wherein a plurality of apparatuses are connected by P1394 serial buses.

(1) A description will be made in a case wherein selection is performed at the VTR 1 in FIG. 27 using the still image list when all of the TV 1, VTR 2, VTR 3, and CAM 1 can output data. In this case, the still image list is output to and displayed on a monitor. The user first presses the PHOTO LIST key at the fluorescent tube display portion of the VTR 1 as shown in FIG. 17.

The VTR 1 selects apparatuses having a monitor based on logical addresses which depend on the categories of the apparatuses in the system. In the communication system in FIG. 27, only the TV 1 has a monitor portion which is not in use. Therefore, the TV 1 is selected. As a result, a still image list to be used for input selection at the VTR 1 is displayed on the TV 1.

Figure 18:
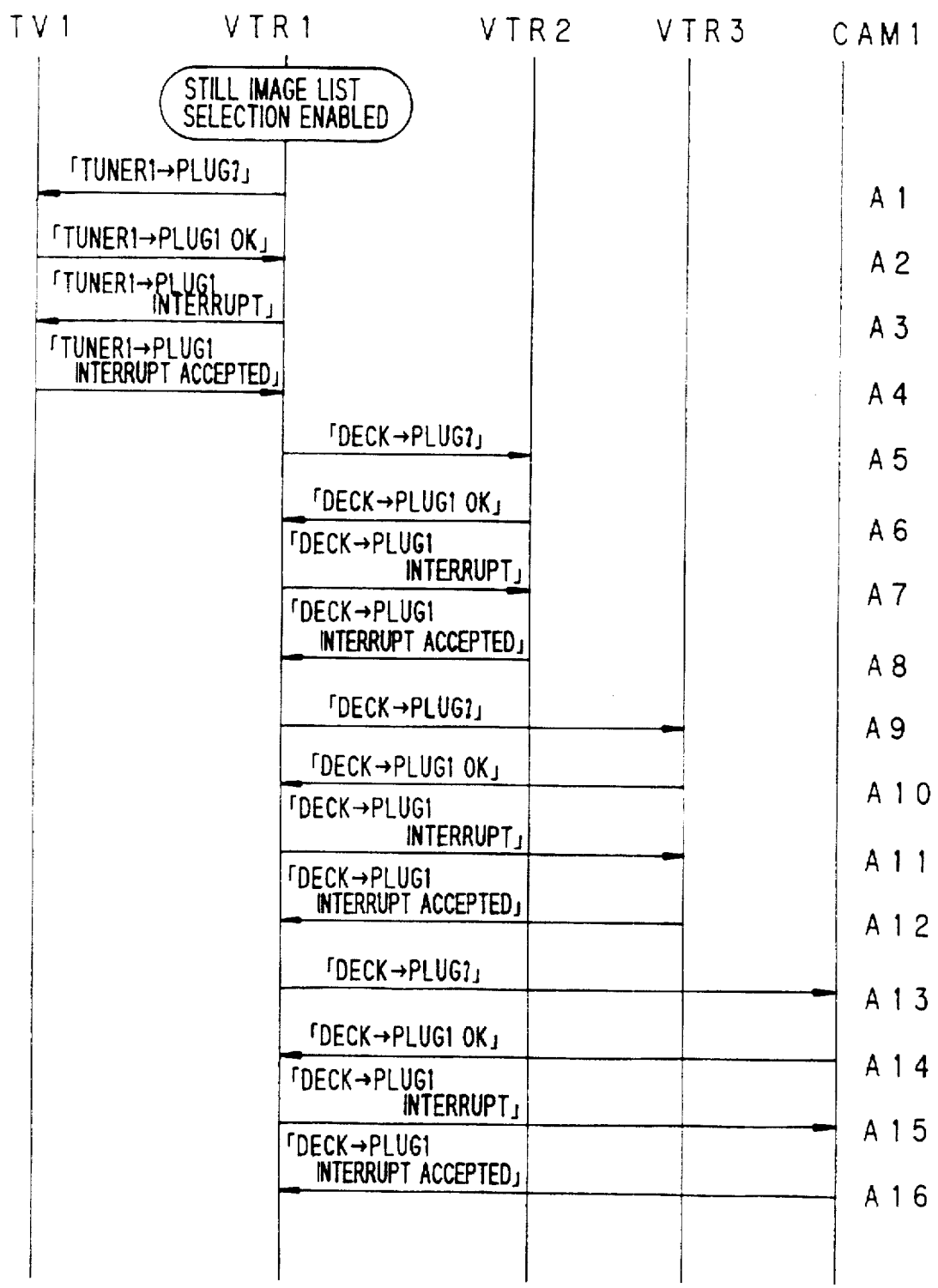
FIG. 18 illustrates an example of command transmission/reception procedures used in the embodiment during the creation of a still image list.

Thereafter, the VTR 1 requests all apparatuses in the system to output data. FIG. 18 shows the exchange of a series of commands used for this purpose. First, the VTR 1 sends a request "Output from tuner portion to plug ?." to the TV 1 (A1). The TV 1 responds "Output is accepted. Output is supplied from tuner portion to plug 1." (A2). The "plug" is a virtual digital plug, e.g., a register for storing the number of the channel and bandwidth used for the input and output of the data provided at a digital interface 16. This plug is treated like a physical plug for the input and output of analog signals.

Figures 21, 22:
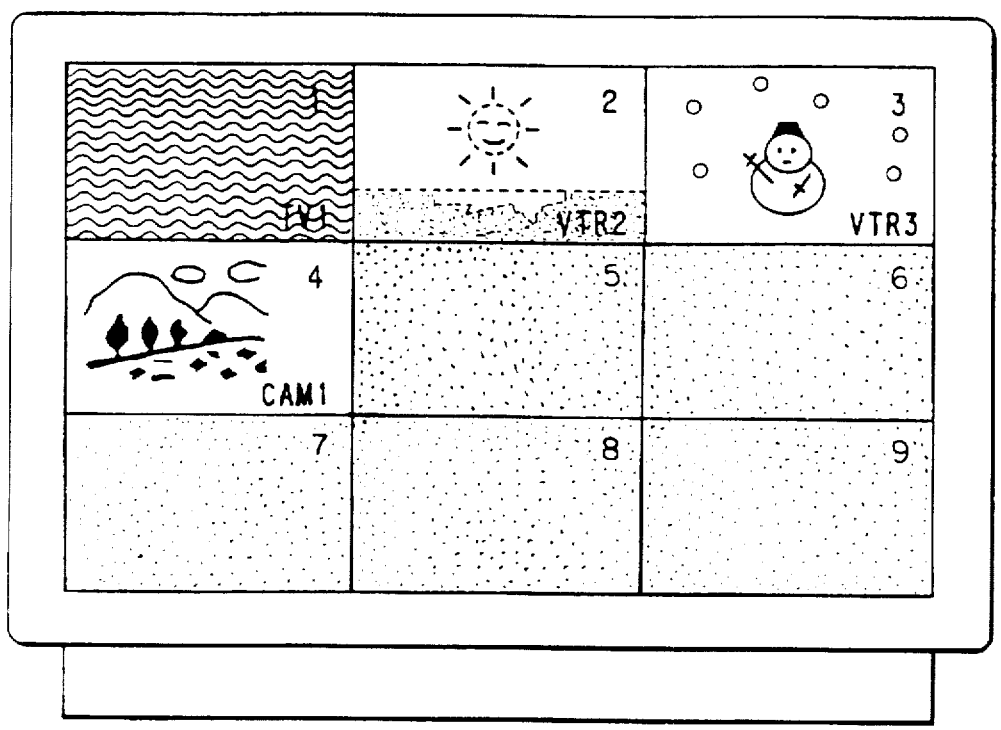
FIG. 21 illustrates an example of the display of a still image list created according to the procedure shown in FIG. 18.
FIG. 22 is a table showing correspondence between numbers on a still image list and the D2B addresses of the apparatuses outputting the still images.
Figure 28:
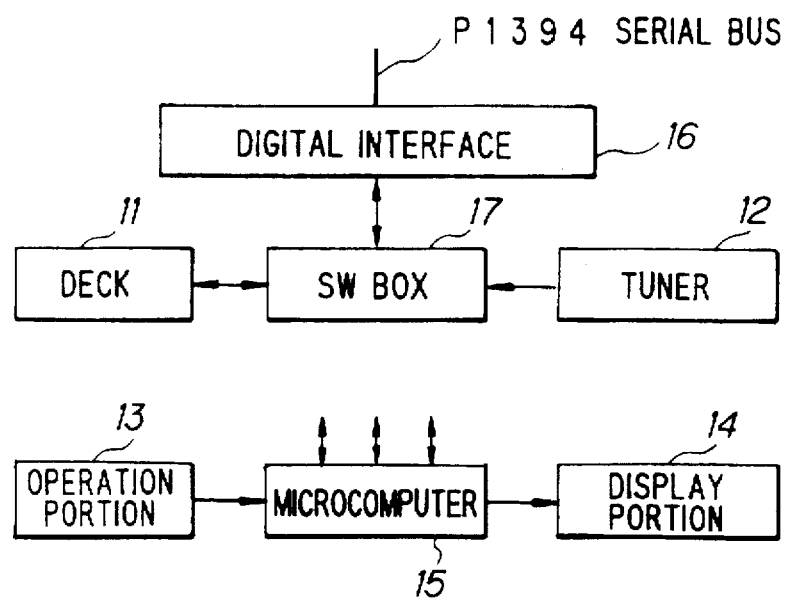
FIG. 28 illustrates a schematic configuration of a VTR in the communication system shown in FIG. 27.

In response to this, the VTR 1 shown in FIG. 28 performs internal switching at the switch box 17 therein to enable input from the plug 1 of the TV 1 to its own plug 1 and fetches one or several frames of the input data into an image memory (not shown) in a microcomputer 15 to create a still image list. Since the still image list is displayed on a screen which is divided into several parts as shown in FIG. 21, the data fetched into the image memory are frame images which have been thinned down depending on the number of the divisions. Further, correspondence between list numbers on the still image list on the divided screen and D2B addresses is registered as shown in FIG. 22.

When the output from the tuner of the TV 1 has been added to the still image list, the bus is immediately released to prevent the bus from being occupied. For this purpose, the VTR 1 sends a request "Interrupt the output from tuner portion to plug 1." to the TV 1 (A3). The TV 1 responds "Interruption is accepted. The output from tuner portion to plug 1 is interrupted." (A4) as shown in FIG. 18.

Images output by the VTR 2, VTR 3, and CAM 1 are similarly added to the still image list according to procedures A5 through A16.

Figure 19:
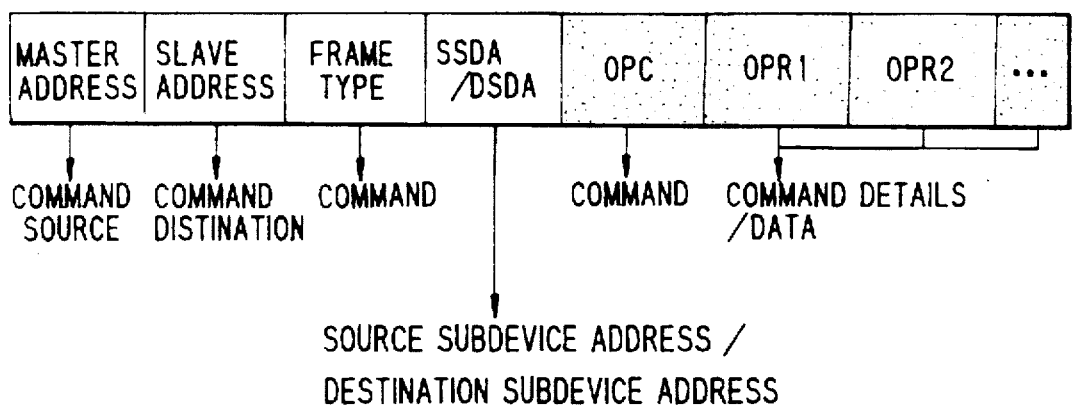
FIG. 19 illustrates an example of a structure of a command packet used in an embodiment of the invention.

FIG. 19 illustrates an example of a structure of a command packet used in the present embodiment. FIG. 20 illustrates an example of a structure of each command packet used in the procedures shown in FIG. 18. The "subdevice" in the abbreviated term SSDA/DSDA means a functional unit (deck, tuner, switch box, etc.) of an apparatus. In FIG. 20, all subdevices are switch boxes, and all commands are instructions to connect or disconnect the virtual digital plugs.

When the creation of a still image list is completed as described above, the still image list is displayed on the monitor portion of the TV 1. FIG. 21 illustrates an example of the display of the still image list. FIG. 22 is a table showing correspondence between numbers on the still image list to be stored and the D2B addresses of the nodes outputting the still images. In FIG. 21, a still image 1 is an image from the TV 1. In this case, it is shown that no image has been output by the TV 1. A still image 2 is an image of the rising sun output by the VTR 1. A still image 3 is an image of a snowman output by the VTR 3. A still image 4 is an image of mountain scenery output by the CAM 1. FIG. 21 shows that no image has been created for the still images 5–9. In the example of display of a still image list in FIG. 21, when one frame of image is fetched into the image memory for each apparatus, one frame is displayed for each apparatus. If a plurality of frames of image are fetched for each apparatus, a dynamic image for a short period of time can be displayed for each apparatus by sequentially displaying the plurality of frames.

(2) A description will be made on a case wherein the CAM 1 has no tape cassette loaded therein.

Figure 23:
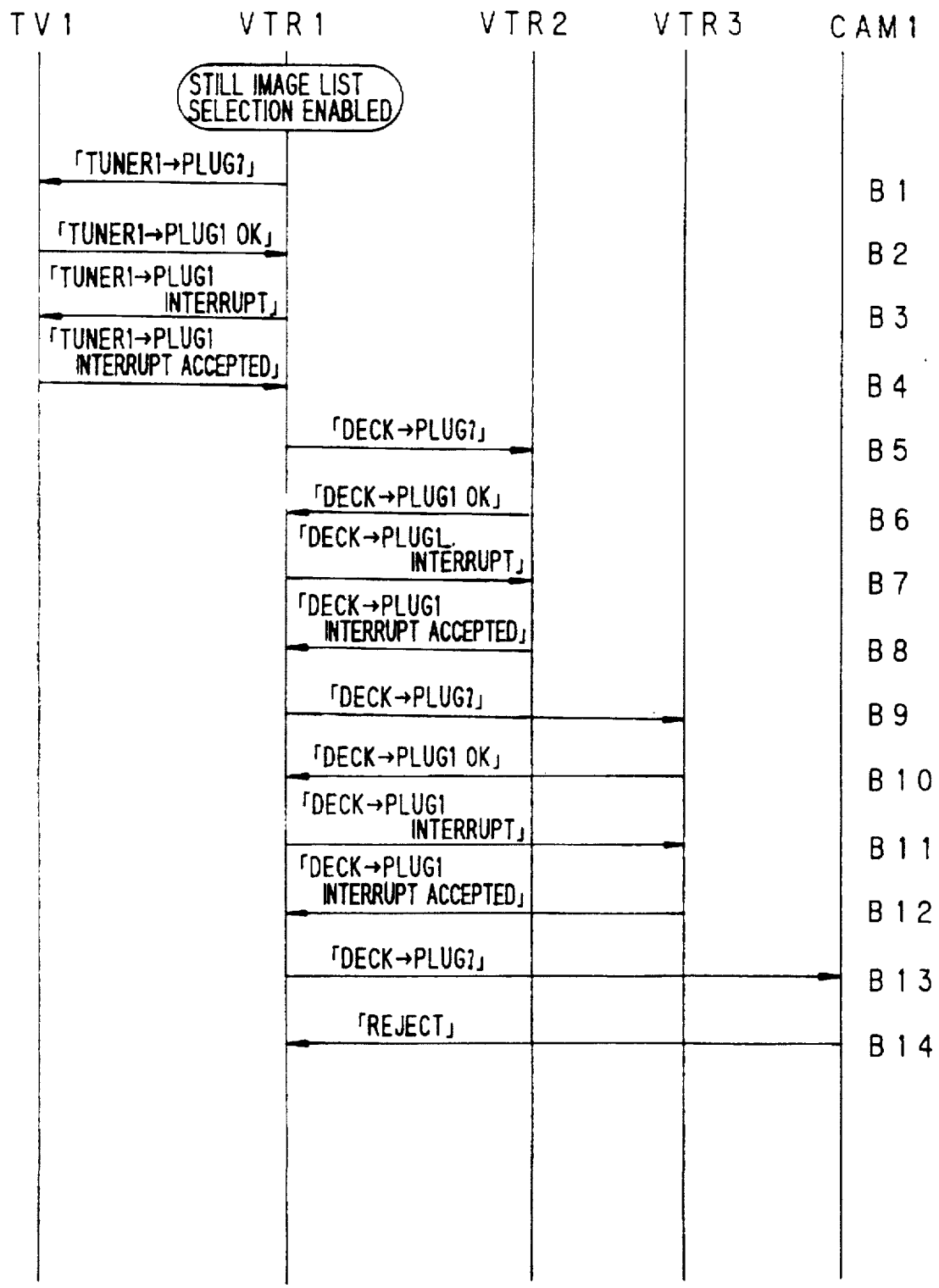
FIG. 23 illustrates another example of the command transmission/reception procedures used in the embodiment during the creation of a still image list.

FIG. 23 shows a series of commands exchanged in this case. The processes up to the creation of a list showing the TV 1, VTR 2, and VTR 3 by the VTR 1 (B1–B12) are the same as A1–A12 in the above-described case (1) in FIG. 18.

When the VTR 1 requests the CAM 1 to output (B13), the CAM 1 responds "output disabled" because it is unable to reproduce due to the absence of a tape cassette (B14). Therefore, no reproduction image from the CAM 1 is included in the still image list.

Figure 25:
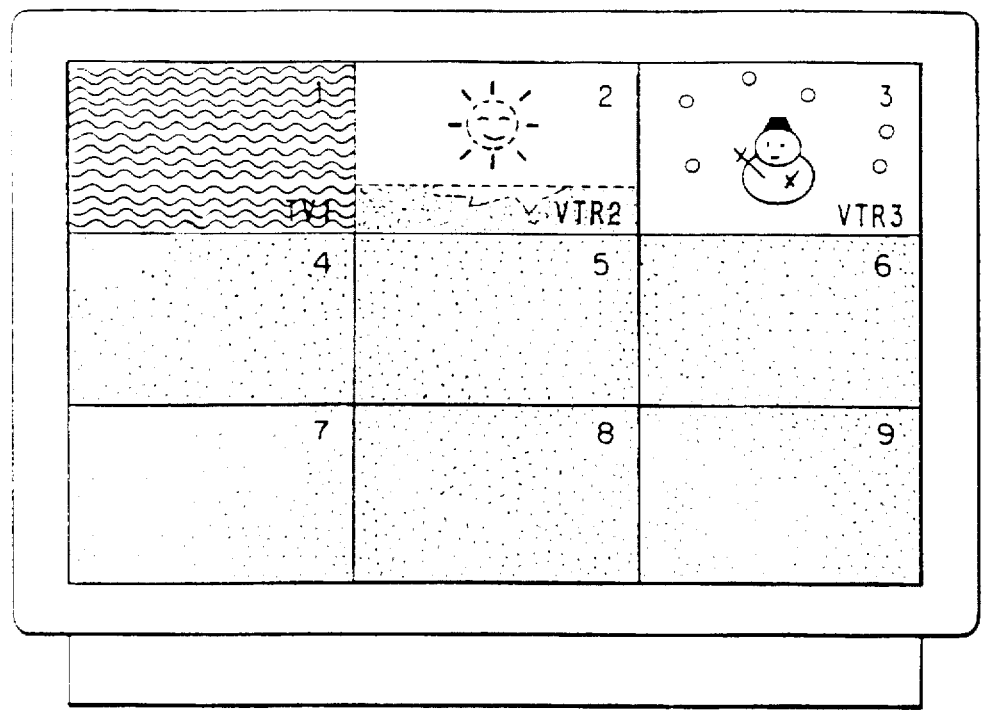
FIG. 25 illustrates an example of the display of a still image list created according to the procedures shown in FIG. 23.
Figure 26:
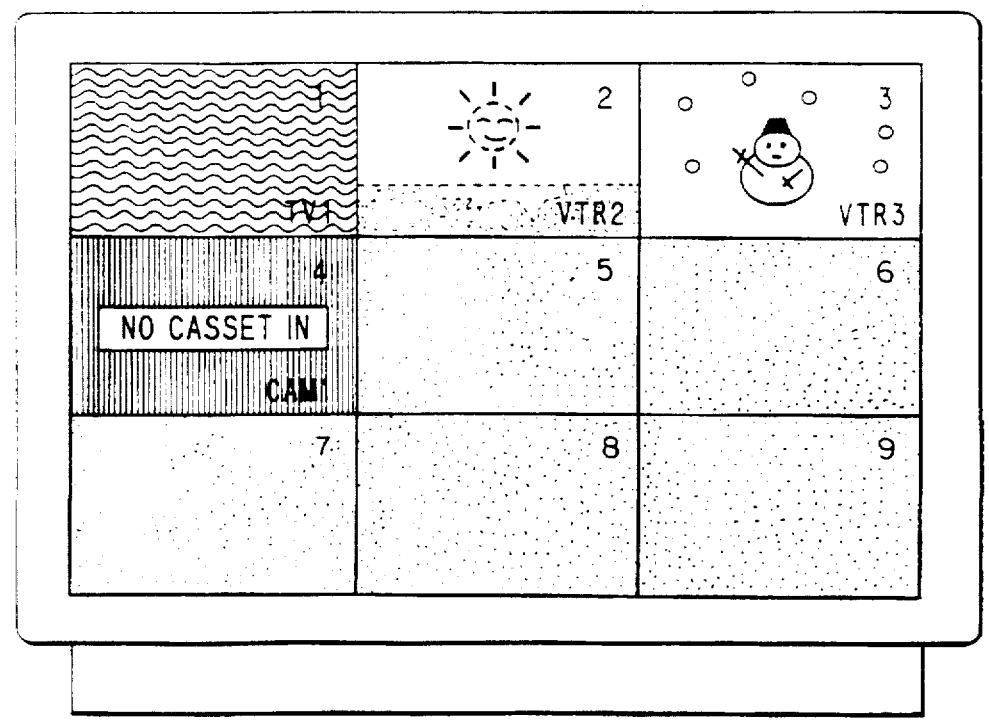
FIG. 26 illustrates an example of the display of a still image list created according to the procedures shown in FIG. 23 with a partial modification thereto.

FIG. 24 illustrates an example of a structure of each command packet used in the procedures shown in FIG. 23. FIG. 25 illustrates an example of the display of the still image list. In the example shown in FIG. 25, only apparatuses capable of outputting image data will output still images to be added to the list. Therefore, a user can not discriminate between apparatuses unable to output and apparatuses which are not in the system. In order to solve this problem, an arrangement for showing all of the apparatuses in the system on the still image list may be provided wherein, for example, a request for status information is issued to the CAM 1 in response to the reply "output disabled" to the request for output from the VTR 1 to the CAM 1 and, if a reply "No Medium In" is returned, the background is muted and an error message such as "No Cassette In" is displayed as shown in FIG. 26.

Although input switching is performed according to the images (each consisting of one or plural frames) in the displayed still image list in the present embodiment, an alternative method may be used wherein the still images are sequentially created for all apparatuses as in the above-described cases (1) and (2); when a still image list showing all apparatuses is complete, a request for output is issued to the apparatuses in the order they were listed; each apparatus outputs the dynamic image available at the time of the request for several seconds and releases the bus to allow the next apparatus to output a dynamic image. In this case, each of the numbered images displayed in the still image list is switched to a dynamic image if the apparatus is outputting a dynamic image. This makes it possible to select an input apparatus with reference to such dynamic images using the minimum amount of image memory required for the creation of the still image list.

(3) A description will now be made on a case wherein the mountain scenery (the image reproduced by the CAM 1) is selected as input from the still image list. For example, the mountainous scenery numbered 4 is selected from among the four still images numbered 1–4 displayed as in FIG. 21. Then, since the VTR 1 has stored the table showing correspondence between the still images and the D2B addresses of the apparatuses which reproduce the still images as shown in FIG. 22, the user can automatically perform input switching to receive the signal from the CAM 1 by simply selecting the still image numbered 4 without checking the D2B address of the apparatus reproducing the mountain scenery.

In the above-described embodiments of the present invention, a P1394 serial bus is used as the communication bus. However, other buses may be used as long as they have signal lines that allow signals to be freely exchanged between control lines and apparatuses.

The present invention is not limited to systems wherein only AV apparatuses are connected but may be applied to systems for connecting computers to allow the transmission and reception of data. Further, although all apparatuses are connected to a P1394 serial bus in the embodiments of the invention an analog TV may be connected to an analog AV output terminal of the VTR 1 to allow a still image list created at the VTR 1 to be displayed on the analog TV. In this case, if the analog TV is treated as a subdevice of the VTR 1, procedures utilizing a command packet having the structure shown in FIG. 19 may be employed.

Although a still image list is created by performing input switching to input images actually received by the tuner portion of a TV and images reproduced by the deck portions of VTR's in the above-described embodiments, an arrangement may be made wherein a memory is provided in each tape cassette having images recorded therein to store the first one of the recorded images as a still image and the still image in the memory is transmitted to an apparatus which has issued a request for a still image to be listed.

Although a command requesting output is transmitted based on a decision on the category of the apparatus to receive the command, e.g., a command to the TV 1 specifies output from the tuner 1 internally connected to the TV 1 by default because it is known that the TV 1 D2B address belongs to a category "TV" in the above-described embodiments, it is possible to use a command "Output from any subdevice".

The applicant has made the following applications which are related to the present application.

European Patent Publication No. 0614297, corresponding to U.S. application Ser. No. 08/183,396

Japanese Patent Application No. 05126682, corresponding to U.S. application Ser. No. 08/878,279

Japanese Patent Application No. 05200056, corresponding to U.S. application Ser. No. 08/403,708

Japanese Patent Application No. 06051246, corresponding to U.S. Pat. No. 5,563,886

Japanese Patent Application No. 06134940, corresponding to U.S. Pat. No. 5,621,725

Japanese Patent Application No. 06242255, corresponding to U.S. application Ser. No. 08/502,772.

Applications for U.S. patent for the above six inventions are pending. (The above applications are owned by the assignee of the present invention and hereby incorporated by reference.)

While the present invention has been illustrated and described in connection with the preferred embodiments, it is not to be limited to the particular structures shown. It should be understood by those skilled in the art that various changes and modifications may be made within the purview of the appended claims without departing from the spirit and scope of the invention in its broader aspects.

What is claimed is:

1. A method of connecting a plurality of electronic apparatuses by a communication control bus to allow communication between said plurality of electronic apparatuses comprising the steps of:

sending from a selected one of said plurality of electronic apparatuses an inquiry to each other one of said plurality of electronic apparatuses whether said each other one of said plurality of electronic apparatuses is able to output data to said selected one via said communication control bus;

receiving at said selected one a reply from said each other one of said plurality of electronic apparatuses;

designating apparatuses able to output data as candidate input apparatuses based on said reply;

displaying an identifying symbol representing each of said candidate input apparatuses; and selecting by a user an input apparatus from among said candidate input apparatuses based on said displayed identifying symbols.

2. The method according to claim 1 further comprising the steps of:

identifying apparatuses not able to output data as disabled apparatuses based on said reply;

discerning reasons for said disabled apparatuses' inability to output data based on said reply; and displaying messages indicating said reasons said disabled apparatuses are unable to output data.

3. The method according to claim 2 wherein said step of displaying messages occurs in said disabled electronic apparatuses.

4. The method according to claim 2 wherein said step of displaying messages occurs in said selected one of said plurality of electronic apparatuses.

5. A method of connecting a plurality of electronic apparatuses by a communication control bus to allow communication between said plurality of electronic apparatuses comprising the steps of:

sending a request to output still image data from a selected one of said plurality of electronic apparatuses to each other one of said plurality of electronic apparatuses via said communication control bus;

receiving at said selected one said still image data transmitted via said communication control bus from said each other one of said plurality of electronic apparatuses that is to provide an input to said selected one;

creating an arrangement of still images received from said each other one of said plurality of electronic apparatuses;

displaying said arrangement of still images; and selecting by a user an input apparatus that is to provide said input to said selected one based on said displayed arrangement of still images.

6. The method according to claim 5, wherein said arrangement of still images is created from a plurality of still image frames from said each other one of said plurality of electronic apparatuses, thereby producing a respective moving image from each apparatus.

7. The method according to claim 6, wherein for electronic apparatuses which are unable to generate said still image data creating a message to show a reason such apparatuses are unable to generate said still image data.

8. The method according to claim 6, further comprising the steps of:

causing said each other one of said plurality of electronic apparatuses generating said still image data to sequentially transmit additional image data for a predetermined period of time after the creation of said arrangement of still images;

sequentially updating said still images making up said arrangement of still images with said additional image data; and selecting by a user an input apparatus based on said updated arrangement of still images.

9. A system of interconnected electronic apparatuses which communicate image data therebetween comprising:

an interface connected to each of said electronic apparatuses controlling an input and an output of said image data;

control means connected to each of said electronic apparatuses for sending an inquiry whether an apparatus is able to output image data to each other one of said electronic apparatuses and for receiving a reply from said each other one of said electronic apparatuses;

display means connected to each one of said electronic apparatuses for displaying the identity of electronic apparatuses which have replied that they can output image data as candidate input apparatuses; and selection means connected to each one of said electronic apparatuses for selecting by a user an input apparatus from among said candidate input apparatuses.

10. The system of interconnected electronic apparatuses according to claim 9, wherein for electronic apparatuses replying to said inquiry that they can not output image data, said display means displays a reason for said electronic apparatuses' inability to output image data.

11. The system of interconnected electronic apparatuses according to claim 10, wherein the reason for the electronic apparatuses' inability to output image data is displayed on said display means connected to said electronic apparatuses.

12. The system of interconnected electronic apparatuses according to claim 10, wherein the reason for the electronic apparatuses' inability to output image data is displayed on said display means connected to the apparatus making the inquiry.

13. A system of interconnected electronic apparatuses which communicate image data therebetween comprising:

an interface bus connected to each of said electronic apparatuses for controlling an input and an output of said image data;

control means connected to each of said electronic apparatuses for requesting a still image output from each of said electronic apparatuses and for compiling an arrangement of still images;

display means connected to said control means for displaying said arrangement of still images; and selection means operated by a user for selecting an image generating apparatus based on said displayed arrangement of still images.

14. The system according to claim 13, wherein said arrangement of still images is created from a plurality of still image frames of image data generated by each of said electronic apparatuses.

15. The system according to claim 14, wherein an entry is made in said arrangement of still images for electronic apparatuses which can not generate image data, said entry showing a reason said apparatuses are unable to generate image data.

16. The system according to claim 14, wherein said control means further comprises:

means for causing image generating electronic apparatuses to sequentially transmit additional image data for a predetermined period of time after creation of said arrangement of still images;

means for updating said arrangement of still images with said additional image data; and means operated by a user for selecting said image generating apparatus based on said updated arrangement of still images.

\* \* \* \* \*